United States Patent Office 3,258,484
Patented June 28, 1966

3,258,484
CYCLIC PHOSPHORUS COMPOUNDS
Henry Tolkmith, Midland, Mich., assignor to The Dow Chemical Company, Midland, Mich., a corporation of Delaware
No Drawing. Filed Feb. 12, 1964, Ser. No. 344,250
4 Claims. (Cl. 260—551)

The present invention is directed to cyclic phosphorus compounds and is directed, in particular, to cyclic phosphorus compounds of the formula

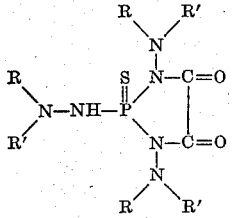

In compound of this and succeeding formulae, each moiety represented by R is the same loweralkyl radical, and each moiety represented by R' is the same member selected from the group consisting of loweralykl, phenyl, and tolyl. In the present specification and claims, the term "loweralkyl" is employed to designate an alkyl radical being of from 1 to 4, inclusive, carbon atoms. These compounds are oils or crystalline solid materials of low solubility in water and of moderate solubility in numerous organic solvents. The compounds are useful as parasiticides and are adapted to be employed as active constituents in compositions for the control of various insect, mite, helminth, bacterial, and fungal organisms. The compounds are particularly suited for the control of plant-infesting fungal organisms.

The novel compounds of the present invention are prepared by reacting oxalyl chloride with a phosphorothioic trihydrazide of the formula

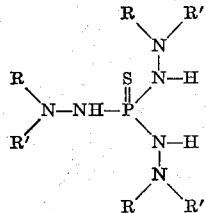

in the presence of a hydrogen halide acceptor and of an inert liquid reaction medium.

Conveniently, an organic liquid is employed as inert liquid reaction medium. Hydrocarbons and ethers boiling below 150° C. at one atmosphere are classes of suitable organic liquids. Representative appropriate organic liquids include benzene, hexane, toluene, ethylbenzene, diethyl ether, isopropyl methyl ether, and methyl ethyl ether. The hydrogen halide acceptor can be any of those commonly employed in organic synthesis, such as a tertiary organic base, an alkali metal hydride, or an alkali base, such as an alkali metal carbonate. Preferred hydrogen halide acceptors are pyridine and triethylamine.

The reaction takes place at temperatures of from −30° C. to 100° C. and preferably, at temperatures of from −20° C. to 30° C., with the production of the desired product compound and of halide of reaction. This halide appears in the reaction medium as the tertiary organic base hydrohalide or as the alkali metal halide. The reaction takes place at pressures over a wide-range, but is conveniently practiced at atmospheric pressure.

The amounts of the reactants and the hydrogen halide acceptor employed are not critical, some of the desired product being produced when employing the reactants in any amounts. However, when it is desired to employ the reactants and the hydrogen halide acceptor in amounts which represent those consumed in the reaction, it is preferred to employ one molecular proportion of oxalyl chloride, one molecular proportion of phosphorothioic trihydrazide, and two or more molecular proportions of hydrogen halide acceptor.

In carrying out the reaction, the reactants are mixed and contacted together in any convenient fashion in the presence of the hydrogen halide acceptor and of inert liquid reaction medium. Some of the desired product is produced immediately upon the initial contacting of the reactants; however, the yield of the desired product is increased by permitting the reaction mixture to stand for a period of time. Following the completion of the reaction, the unmodified reaction mixture can be employed for the useful purposes of the present invention or, if desired, the product compound can be separated from the reaction mixture. In such procedures, halide of reaction can be removed by washing with water or by filtration; and inert liquid reaction medium can be removed by fractional distillation or evaporation under subatmospheric pressure to obtain the desired product as a residue. The product residue can be employed without purification or can be purified by any of the conventional procedures, such as, for example, washing with water and dilute aqueous alkali metal hydroxide, solvent extraction, recrystallization, and the like.

The following examples illustrate the best mode now known of the present invention and will enable those skilled in the art to practice the invention.

*Example 1.*—*2-(2,2-dimethylhydrazino)-1,3-bis(dimethylamino)-1,3,2-diazaphospholidine-4,5-dione-2-sulfide*

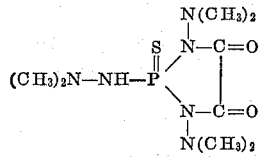

Oxalyl chloride (25 grams; 0.2 mole) was dispersed in 200 milliliters of benzene, and the resulting dispersion added portionwise at room temperature over a period of about 6 hours to an agitated solution of triethylamine (45 grams; 0.45 mole) and 2,2,2',2',2'',2''-hexamethylphosphorothioic trihydrazide (48 grams; 0.2 mole) in 350 milliliters of benzene. Thereafter, the reaction mixture was diluted with 500 milliliters of benzene, and the diluted reaction mixture filtered. Benzene was evaporated from the filtrate to obtain a residue, the residue mixed with 500 milliliters of cyclohexane, and the cyclohexane removed from the mixture by evaporation under subatmospheric pressure to obtain the 2-(2,2-dimethylhydrazino) - 1,3-bis(dimethylamino) - 1,3,2 - diazaphospholidine-4,5-dione-2-sulfide product as a residue. This product residue was dissolved in two liters of a 1:1 mixture of cyclohexane and ligroin (boiling at 60–70° C.) and allowed to crystallize from this solution; thereafter, the solution was filtered to separate the crystalline product which was further purified by recrystallization from a 3:1 mixture of cyclohexane and benzene. The product has a molecular weight of 294.3, and is a white crystalline solid melting at 175–177° C.

In a similar manner, other compounds representative of the present invention are prepared as follows:

From 2,2,2',2',2'',2''-hexaethylphosphorothioic trihydrazide and oxalyl chloride, 2-(2,2-diethylhydrazino)-1,3-bis(diethylamino)-1,3,2-diazaphospholidine-4,5-dione-2-sulfide product having a molecular weight of 378.5.

From 2,2',2''-trimethyl-2,2',2''-tri-n-butylphosphorothioic trihydrazide and oxalyl chloride, 2-(2-methyl-2-n- butylhydrazino)-1,3-bis(N-methyl-N-n-butylamino)-1,3,2-diazaphospholidine-4,5-dione-2-sulfide product having a molecular weight of 420.6.

From 2,2,2',2',2",2"-hexaisopropylphosphorothoic trihydrazide and oxalyl chloride, 2-(2,2-diisopropylhydrazino)-1,3-bis(diisopropylamino)-1,3,2-diazaphospholidine-4,5-dione-2-sulfide product having a molecular weight of 462.7.

From 2,2,2',2',2",2"-hexaisobutylphosphorothioic trihydrazide and oxalyl chloride, 2-(2,2-diisobutylhydrazino)-1,3 - bis(diisobutylamino) - 1,3,2-diazaphospholidine-4,5-dione-2-sulfide product having a molecular weight of 546.8.

From 2,2',2" - trimethyl - 2,2',2" - triphenylphosphorothioic trihydrazide and oxalyl chloride, 2-(2-methyl-2-phenylhydrazino) - 1,3-bis(N-methylanilino)-1,3,2-diazaphospholidine-4,5-dione-2-sulfide product having a molecular weight of 480.5.

From 2,2',2"-triethyl-2,2',2"-triphenylphosphorothioic trihydrazide and oxalyl chloride, 2-(2-ethyl-2-phenylhydrazino) - 1,3 - bis(N-ethylanilino)-1,3,2-diazaphospholidine-4,5-dione-2-sulfide product having a molecular weight of 522.6.

From 2,2',2"-tri-n-propyl-2,2',2"-triphenylphosphorothioic trihydrazide and oxalyl chloride, 2-(2-n-propyl-2-phenylhydrazino)-1,3-bis(N-n-propylanilino)-1,3,2-diazaphospholidine-4,5-dione-2-sulfide product having a molecular weight of 564.7.

From 2,2',2" - triisobutyl-2,2',2"-triphenylphosphorothioic trihydrazide and oxalyl chloride, 2-(2-isobutyl-2-phenylhydrazino) - 1,3-bis(N-isobutylanilino)-1,3,2-diazaphospholidine-4,5-dione-2-sulfide product having a molecular weight of 601.8.

From 2,2',2"-trimethyl-2,2',2"-tri-para-tolylphosphorothioic trihydrazide and oxalyl chloride, 2-(2-methyl-2-para-tolylhydrazino) - 1,3-bis(N-methyl-para-toluidino)-1,3,2-diazaphospholidine-4,5-dione-2-sulfide product having a molecular weight of 522.6.

From 2,2',2"-triethyl-2,2',2"-tri-ortho-tolylphosphorothioic trihydrazide and oxalyl chloride, 2-(2-ethyl-2-ortho-tolylhydrazino) - 1,3-bis(N-ethyl-ortho-toluidino)-1,3,2-diazaphospholidine-4,5-dione-2-sulfide product having a molecular weight of 564.7.

When a compound of the present invention is employed as a parasiticide, the compound can be dispersed on a finely divided solid and employed as a dust. Also, such a mixture can be dispersed in water with the aid of a wetting agent and the resulting aqueous suspension employed as a spray. In other procedures, the compound can be employed as a constituent of organic liquid compositions, oil-in-water or water-in-oil emulsions, or water dispersions, with or without the addition of wetting, dispersing, or emulsifying agents.

In representative operations, an aqueous composition containing 4000 parts of 2-(2,2-dimethylhydrazino)-1,3-bis(dimethylamino)-1,3,2-diazaphospholidine-4,5-dione-2-sulfide per million parts by weight of ultimate composition was employed to spray a plot of bean plants, to the point of run-off; thereafter, the plot of sprayed plants was permitted to dry, inoculated with bean mildew, and held under conditions, favorable to the growth of bean mildew for a period of about a week. Observations at the end of the period indicated a substantially complete kill and control of bean mildew.

The phosphorothioic trihydrazide compounds employed as starting materials in the preparation of the compounds of the present invention are prepared in known procedures. In these procedures, a hydrazine compound of the formula

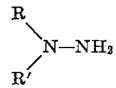

is reacted with thiophosphoryl chloride ($Cl_3P=S$). Good results are obtained when employing three molecular proportions of hydrazine compound and one molecular proportion of thiophosphoryl chloride. Conveniently, the reaction is carried out in an inert liquid reaction medium and in the presence of a hydrogen halide acceptor. Preferably, excess hydrazine compound is employed as hydrogen halide acceptor. The reaction goes forward at temperatures at which hydrogen halide is evolved, but preferably at temperatures below about 30° C. The reaction produces the phosphorothioic trihydrazide compound and by-product which, when excess hydrazine compound is employed as hydrogen halide acceptor, appears in the reaction mixture as the hydrochloride salt of the hydrazine compound. The phosphorothioic trihydrazide product is separated, and, if desired, purified, in conventional procedures.

The hydrazine compound is prepared in known procedures; see Organic Syntheses, Collective Volume II (John Wiley & Sons, Inc., New York, New York, 1943) edited by A. H. Blatt, pages 211–213, inclusive. These pages report the preparation of 1,1-dimethylhydrazine; however all of the hydrazines to be employed in accordance with the teachings of the present invention are prepared by the same procedures, employing as starting material an amine compound of the formula

I claim:
1. Compound of the formula

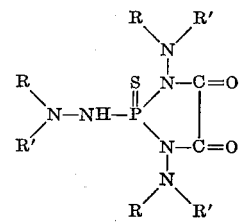

where each moiety represented by R is the same loweralkyl radical, and each moiety represented by R' is the same member selected from the group consisting of loweralkyl, phenyl, and tolyl.

2. 2-(2,2 - dimethylhydrazino)-1,3-bis(dimethylamino-1,3,2-diazaphospholidine-4,5-dione-2-sulfide.

3. 2-(2,2-diethylhydrazino)-1,3-bis(diethylamino)-1,3,2-diazaphospholidine-4,5-dione-2-sulfide.

4. 2 - (2-methyl-2-n-butylhydrazino)-1,3-bis(N-methyl-N - n - butylamino)-1,3,2-diazaphospholidine-4,5-dione-2-sulfide.

No references cited.

WALTER A. MODANCE, *Primary Examiner.*

H. I. MOATZ, *Assistant Examiner.*